(No Model.) 2 Sheets—Sheet 1.
H. B. McKEE.
TAIL BOARD CATCH FOR DUMPING VEHICLES.
No. 523,171. Patented July 17, 1894.
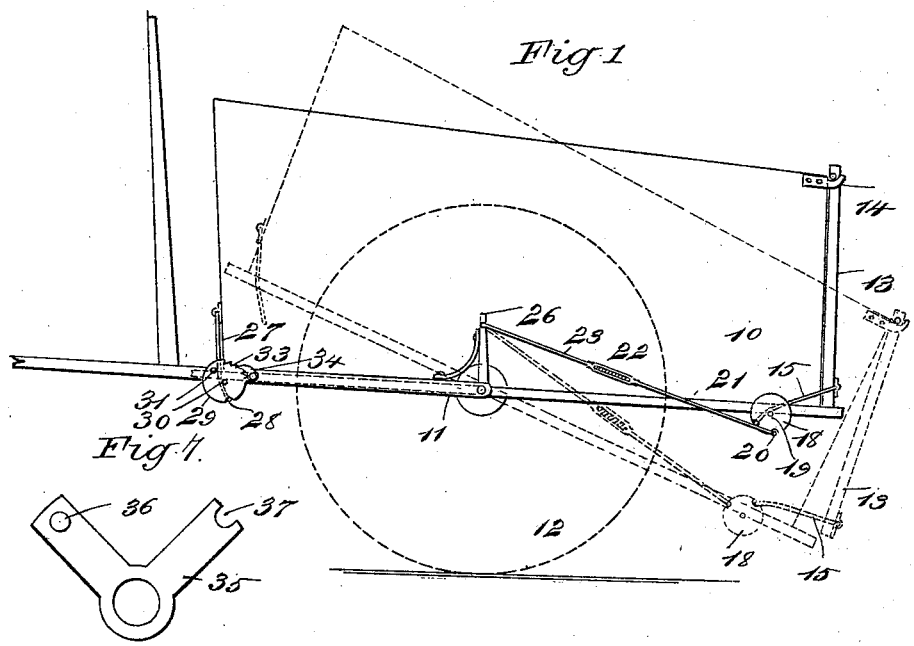
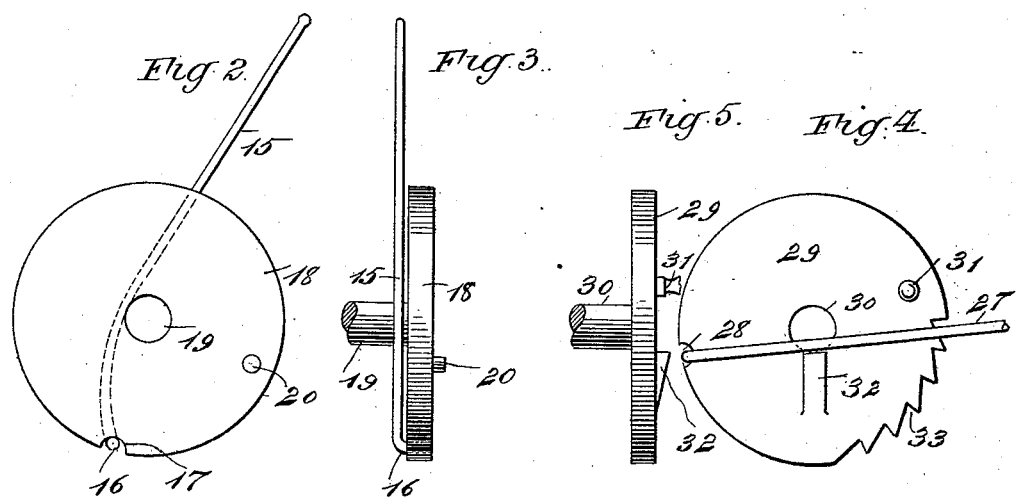
WITNESSES:
INVENTOR
H. B. McKee
BY
Munn & Co.
ATTORNEYS.
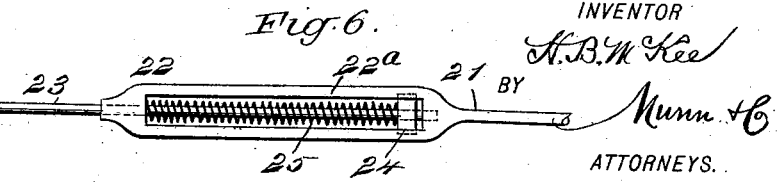

(No Model.) 2 Sheets—Sheet 2.
H. B. McKEE.
TAIL BOARD CATCH FOR DUMPING VEHICLES.

No. 523,171. Patented July 17, 1894.

WITNESSES:
Paul Johot
Ca. Sedgwick

INVENTOR
H. B. McKee
BY
Munn & Co
ATTORNEYS.

UNITED STATES PATENT OFFICE.

HENRY B. McKEE, OF BROOKLYN, NEW YORK.

TAIL-BOARD CATCH FOR DUMPING-VEHICLES.

SPECIFICATION forming part of Letters Patent No. 523,171, dated July 17, 1894.

Application filed March 20, 1894. Serial No. 504,378. (No model.)

*To all whom it may concern:*

Be it known that I, HENRY B. MCKEE, of Brooklyn, in the county of Kings and State of New York, have invented a new and Improved Tail-Board Catch, of which the following is a full, clear, and exact description.

My invention relates to improvements in that class of devices which are adapted for use in fastening the tail-boards of dumping wagons and in fastening the side-boards of dumping cars, or in fact to the swinging parts of any dumping apparatus.

The object of my invention is to produce a very cheap and simple catch, which securely holds the tail-board or analogous article closed until the cart or car is dumped, and which then automatically releases the tail-board so as to permit the dumping of the load.

A further object of my invention is to produce a device of this kind, which can be utilized for holding the cart or car in its normal position.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 8:
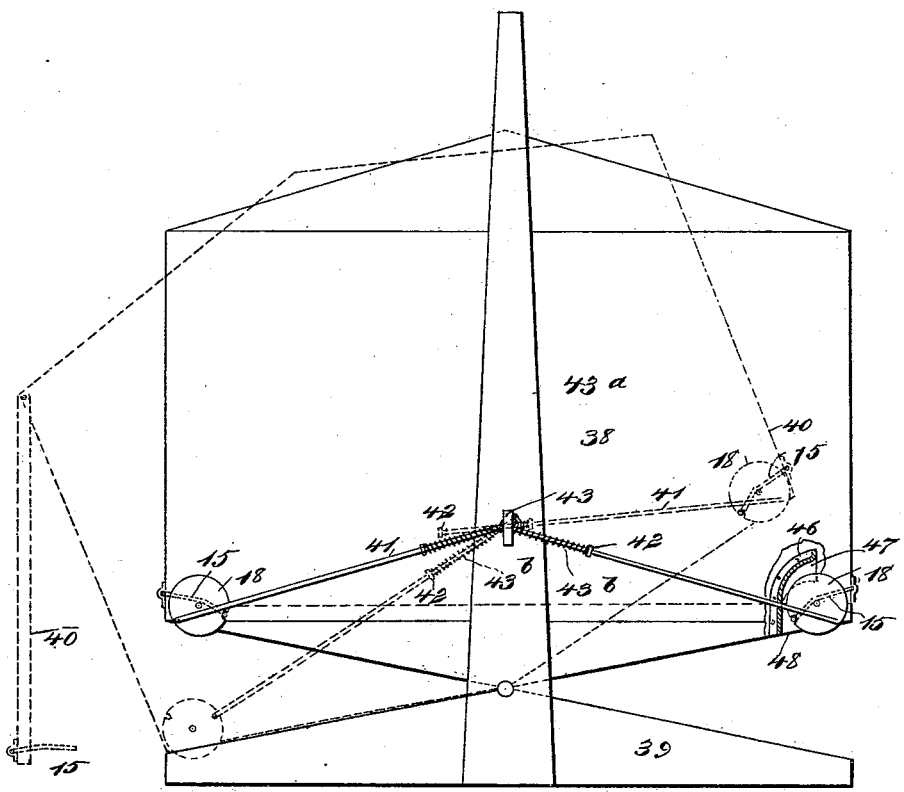
Figure 9:

Figure 1 is a side elevation of a dumping cart provided with my tail-board fastening device, and shows also the application of the device to the front end of the cart to hold it in its normal position. Fig. 2 is an enlarged detail side elevation of the fastening wheel and hook. Fig. 3 is an edge view of the same. Fig. 4 is a detail side elevation of the fastening devices at the front end of the cart, which may also be used at the rear end. Fig. 5 is an edge view of the same. Fig. 6 is a broken detail view of the expansible portion of the operating rod connected with the catch wheel. Fig. 7 is a detail side elevation of a modified form of the catch. Fig. 8 is a detail end view of a dumping car provided with my improved fastening device which, in this case, is used to lock the sides of the car; and Fig. 9 is a detail view, showing the spring arrangement for holding the fastening hooks in position to engage the catch wheels.

The cart 10 may be of any approved construction and, as illustrated, is provided with a frame 11 connecting with the shafts and is mounted on wheels 12. It is provided with the customary tail-board 13 adapted to swing outward, the board being hung at the top, as shown at 14, and the tail-board has, at its opposite ends and near its lower edge, hooks 15 which may be formed on a single rod or journaled independently as desired, these hooks extending forward at the sides of the cart and they terminate in bent ends 16 which engage the notches 17 in the catch wheels 18, these wheels being journaled on opposite sides of the cart and at the bottom, the journal 19 of the wheels extending across the under side of the cart.

The hooks 15 are curved slightly, as best shown in Fig. 2, so that when the wheels 18 are turned forward with the bent ends 16 of the hooks in engagement with the wheels, the said ends will be below the center of the wheel and thus the tail-board will be kept closed. The wheels 18 are provided with pins 20 to which are pivoted the sections 21 of the extensible rods 22, each section 21 having at its forward end a yoke 22$^a$ in which slides the second section 23 of the rod 22, and the rod 23 is held well into the yoke by the spring 25 which presses against a collar 24 on the rod. The forward end of the section 23 of the rod is pivoted to an arm 26 on the frame 11, but this arm may be secured to any stationary portion of the vehicle.

In its normal position, the rod 22 pushes on the wheel 18 so as to hold the notch 17 and bent end 16 of the hook in the position illustrated in Fig. 1, thus locking the tail-board in place. But when the cart is dumped, as shown by dotted lines in Fig. 1, the rod 21 pulls on the wheels 18 so as to turn the same and permit the hooks to slide off, thus releasing the tail-board and permitting the load to slide out of the cart.

An arrangement similar to that just described is used at the front end of the cart to lock the cart in its normal position, and in this case hooks 27 are hung on the front end of the cart and are adapted to engage notches 28 in the catch wheels 29 which are journaled on a cross rod or shaft 30 on the frame of the vehicle, and the wheels have handles 31 by which they may be turned. This straight hook 27 may be substituted for the bent hook 15, in which case the wheel is provided on the outside with an abutment 32 on which the hook may rest. Each wheel 29 is also provided, on one edge, with teeth 33 which are adapted to engage a pawl 34 on the frame 11, and it will be seen that by turning the wheels so as to bring the ends of the hooks beneath the same and engaging the pawls in the teeth, the hooks and wheels will both be locked and the cart fastened. Instead of making complete wheels 18 or 29, as specified, segments of wheels may be used or a bell crank 35 such as is shown in Fig. 7, the bell crank having one arm provided with a pin 36 to engage the rod 22 and the other provided with a notch 37 to engage the hook 15.

It will be seen from the above description, that the releasing of the tail-board is automatic, that is, that the dumping of the cart will cause the tail-board to be released by pulling the rods 21 and turning the catch wheels 18. In Fig. 8 I have shown means for fastening the sides of a car which is adapted to dump its load laterally, and have also shown a guard and guide for the fastening hooks which may be applied to a cart, as illustrated in Fig. 1, if desired.

The car 38 is pivoted on its platform 39, which is adapted to be mounted on trucks in the usual way, but the manner of supporting the car has nothing whatever to do with my invention. The car is provided with the outwardly-swinging side pieces 40, which correspond in action to the tail-board 13, and at the ends of the car adjacent to the side pieces are arranged the catch wheels 18, which are adapted to engage the hooks 15 on the side pieces, in the manner already described. The wheels 18 are operated by rods 41 which extend inward through a keeper 43 on the post 43ª at the end of the car, there being one of these at each end, and the movement of the rods is limited by the collars 42 thereon, while the rods are cushioned by spiral springs 43ᵇ which are coiled around them, between their inner collars and the keeper 43, the tension of these springs being such as to permit the rods to extend somewhat and serving also to assist in throwing the car back to its level position after it has dumped its load.

The hooks 15, as illustrated in Fig. 8 are connected by a rod 44 on which is a spiral spring 45 fastened to the rod and to the adjacent side piece 40, and the tension of the spring is such as to throw the hooks upward in the manner illustrated in Fig. 8, so that they will automatically swing back into engagement with the catch wheels 18, and to further facilitate this engagement a curved guard and guide plate 46 is arranged adjacent to and partially above the wheels 18, a relatively large opening 47 being left between the front end of the plate and the top of the wheel, but this opening gradually narrows until, as shown at 48, it is small enough to force the hook into engagement with the catch wheel. The spring 45 holds up the hooks 15, as illustrated, and consequently when the side pieces 40 swing shut, the hooks enter between the guard plate and catch wheel so as to engage the wheel automatically.

Having thus described my invention, I claim as new and desire to secure by Letters Patent—

1. A catch for tail-boards and analogous articles, comprising a hook journaled on the tail-board, an oscillating catch journaled on the cart adjacent to the tail-board and adapted to engage the hook, and a rod connection between the catch and a stationary portion of the cart, substantially as described.

2. The combination, with the dumping cart and the swinging tail-board, of the hooks on the tail-board, the oscillating catches to engage the hooks, and the extensible rods secured to the catches and to a stationary portion of the cart, substantially as described.

3. The combination, with the cart body and the hooks thereon, of the oscillating catches on the cart frame, provided with notches to engage the hooks, and a ratchet and pawl mechanism for locking the catches, substantially as described.

4. The combination, with the dumping cart, the oscillating catches, the tail-board and the hooks thereon, of the curved guard plates arranged adjacent to the catches and adapted to guide the hooks, substantially as described.

5. The combination, with the dumping cart, the oscillating catches and the guard plates adjacent to the catches, of the tail-board, the hooks on the tail-board to engage the catches, and springs arranged to lift the hooks into contact with the guard plates, substantially as described.

HENRY B. McKEE.

Witnesses:
KEND. BUXTON,
RUSSELL W. MCKEE.